April 30, 1940.  L. S. WILLIAMS  2,198,714
INDICATING DEVICE
Filed July 13, 1937  3 Sheets-Sheet 1
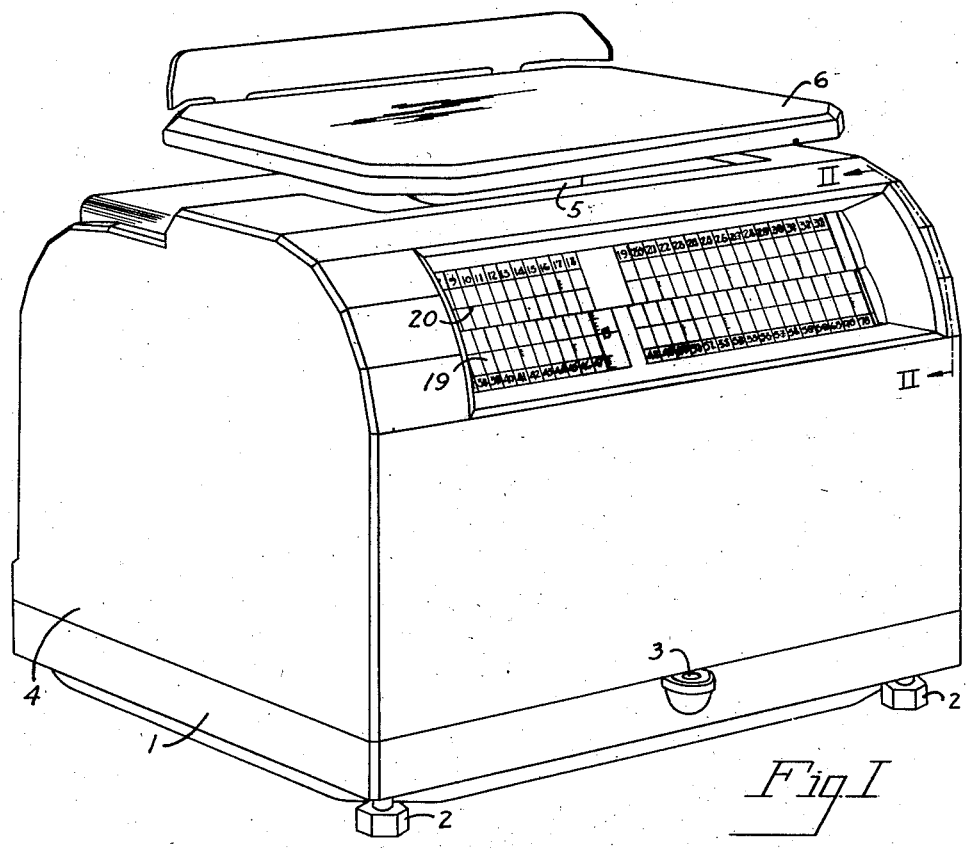
Fig. I
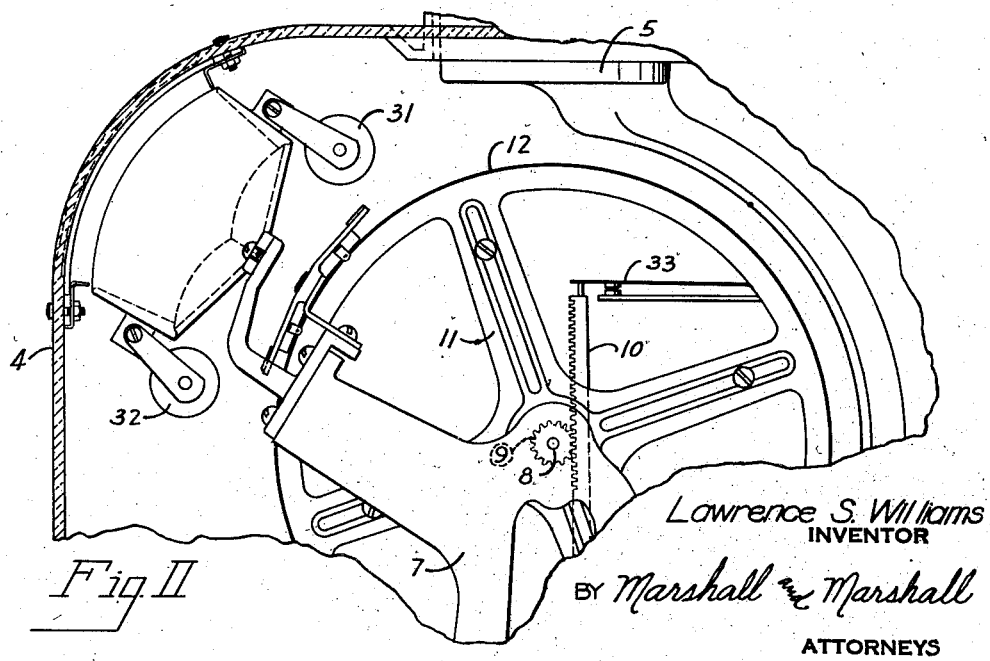
Fig. II
Lawrence S. Williams
INVENTOR
BY Marshall & Marshall
ATTORNEYS April 30, 1940.  L. S. WILLIAMS  2,198,714
INDICATING DEVICE
Filed July 13, 1937  3 Sheets-Sheet 2
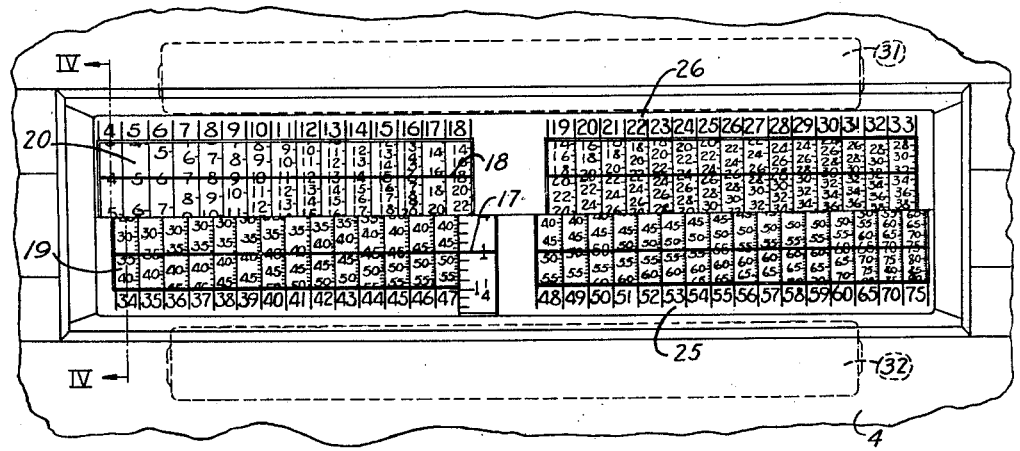
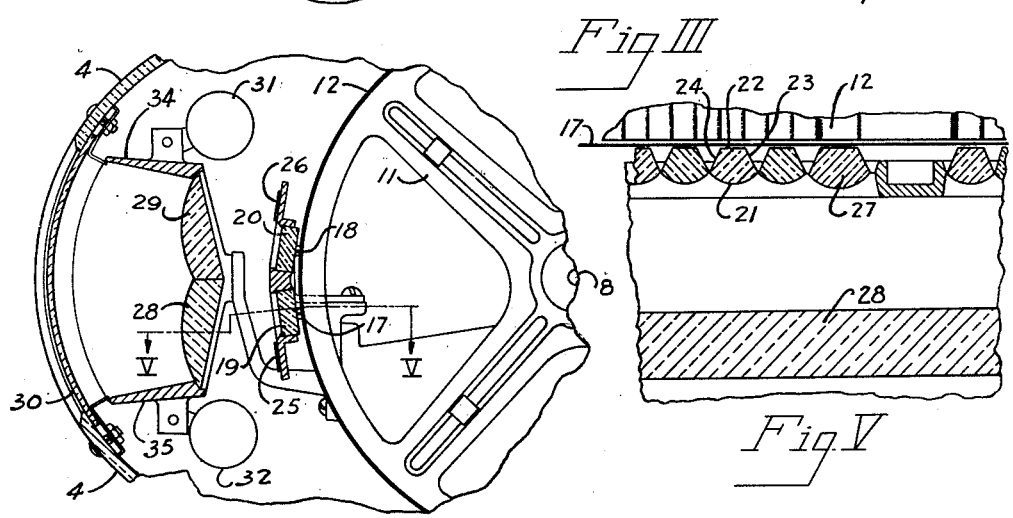
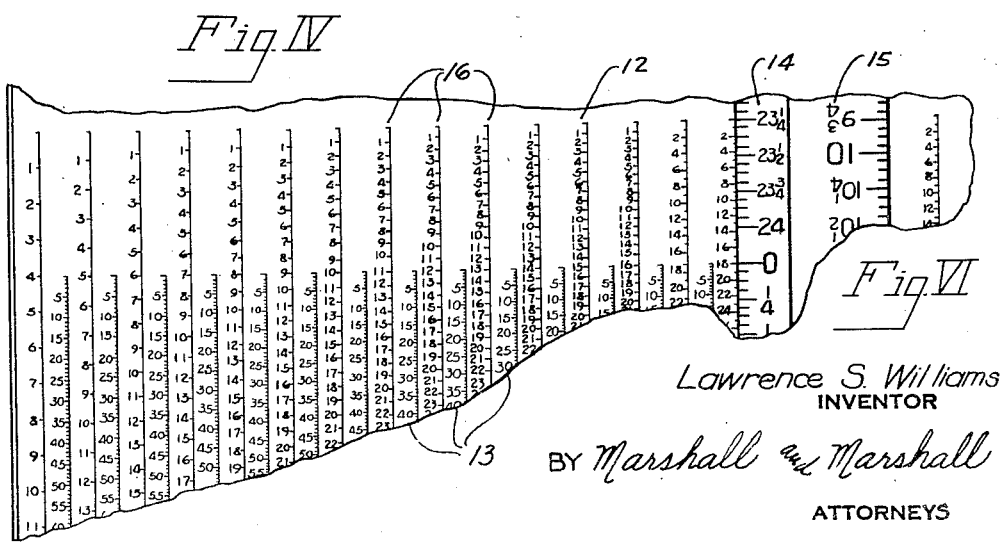
Lawrence S. Williams
INVENTOR
BY Marshall & Marshall
ATTORNEYS April 30, 1940.  L. S. WILLIAMS  2,198,714
INDICATING DEVICE
Filed July 13, 1937   3 Sheets-Sheet 3
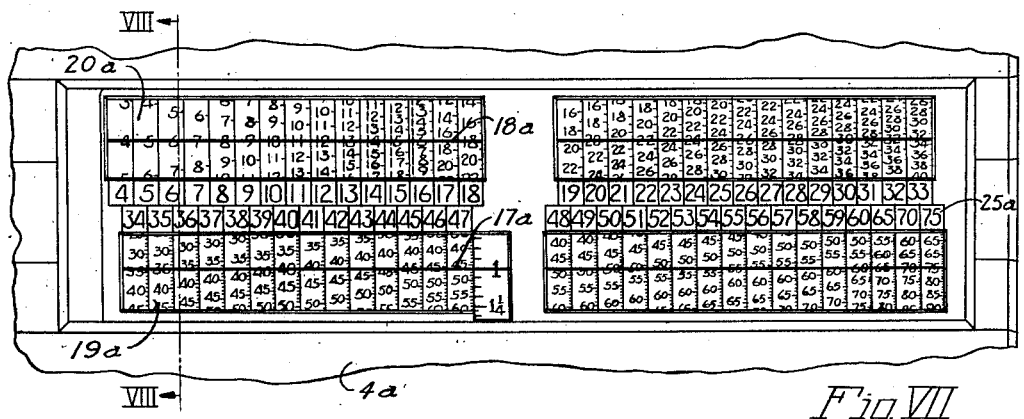
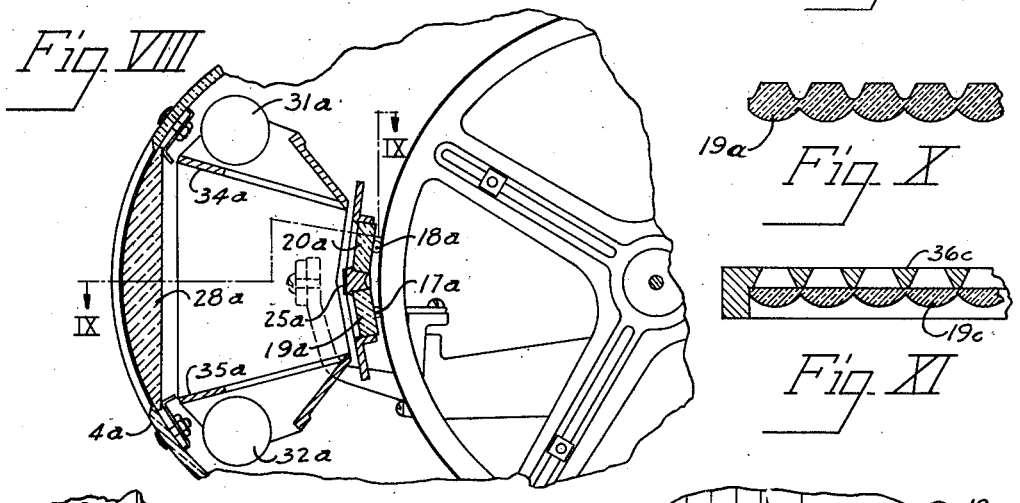
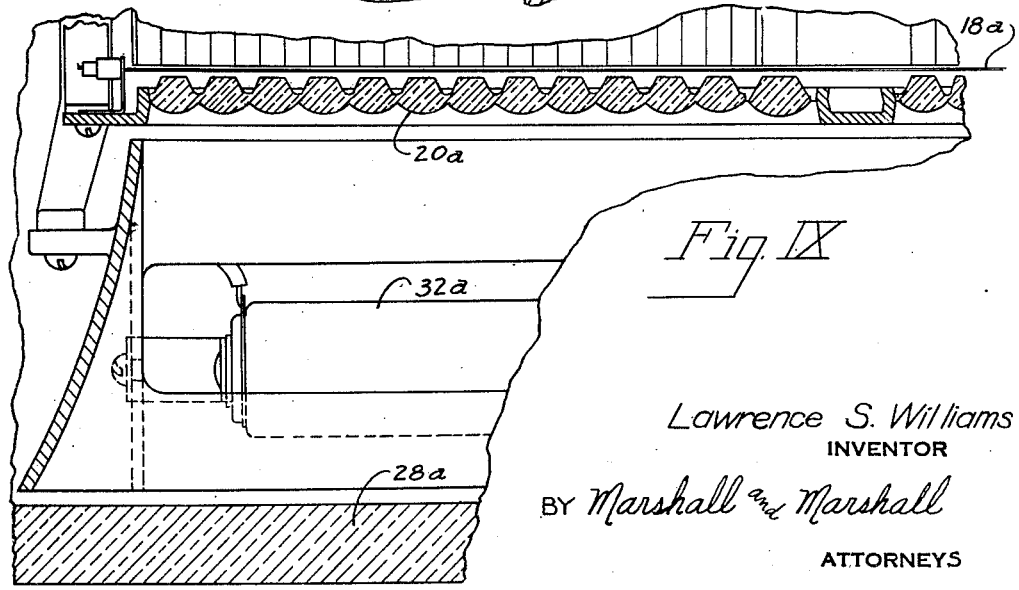
Lawrence S. Williams
INVENTOR
BY Marshall and Marshall
ATTORNEYS Patented Apr. 30, 1940

2,198,714

UNITED STATES PATENT OFFICE 2,198,714

INDICATING DEVICE

Lawrence S. Williams, Toledo, Ohio, assignor to Toledo Scale Manufacturing Company, Toledo, Ohio, a corporation of New Jersey Application July 13, 1937, Serial No. 153,378

9 Claims. (Cl. 88—1)

This invention relates particularly to devices for indicating computed values which are shown in columns on charts.

One of the principal objects of the invention is to provide means for separately magnifying the computed values of each column.

Another object of the invention is to provide means for magnifying the computations in a series of adjacent columns, which magnifying means exposes the computations in all the columns of the series to view at the same time.

Another object of the invention is to provide means for magnifying computations in a series of adjacent columns, which magnifying means enables the computations to be viewed without obscuration or great distortion from positions not directly in front of the computations.

Another object of the invention is to provide means for magnifying the widths of narrow adjacent columns, which magnifying means renders visible a section of each column, the lengths of such sections being substantially greater than their widths.

Another object of the invention is the provision of separate means for magnifying the apparent width of each of a series of adjacent columns of computations in combination with common means for magnifying the lengths of a series of adjacent sections of such columns of computations.

And still another object of the invention is the provision of means for economically producing magnifying means capable of accomplishing the above-mentioned objects.

Other objects and advantages will be apparent from the following description, in which reference is had to the accompanying drawings illustrating a preferred embodiment of my invention and wherein similar reference numerals designate similar parts throughout the several views.

In the drawings:

Figure I is a view in perspective of a weighing scale embodying my invention;

Figure II is an enlarged fragmentary elevational view showing a part of the mechanism of the scale illustrated in Figure I, part of the housing of the scale being shown in section taken substantially on the line II—II of Figure I;

Figure III is an enlarged fragmentary front elevational view showing the indicating means employed in the scale illustrated in Figure I;

Figure IV is a fragmentary elevational view of the indicating mechanism of the scale, parts being shown in section taken along the line IV—IV of Figure III;

Figure V is a further enlarged fragmentary plan view with parts shown in section taken along the line V—V of Figure IV;

Figure VI is a similarly further enlarged fragmentary front elevational view showing a portion of a chart which forms an element of my invention;

Figure VII is an enlarged fragmentary front elevational view showing a modified form of indicating means;

Figure VIII is an enlarged fragmentary elevational view of the modified form of indicating mechanism, parts being shown in section on the line VIII—VIII of Figure VII;

Figure IX is a further enlarged fragmentary plan view showing a portion of the modified form of indicating mechanism, parts being in section along the line IX—IX of Figure VIII;

Figure X is a top plan view showing a set of the lenses employed in the modification illustrated in Figures VII, VIII and IX, the lenses being integrally formed for economy in production and assembly; and Figure XI is a fragmentary sectional elevational view showing another set of integrally formed lenses, with a fragment of a grid-like frame upon which the lenses are mounted.

Referring to the drawings in detail, the mechanism of the scale illustrated in Figure I is supported on a base 1 provided with leveling feet 2 and a spirit level 3. Surmounting the base 1 is a housing 4 having an opening in its top through which a platter support 5 extends upwardly to support a goods platter 6, the platter support 5 being connected to suitable lever and load-counterbalancing mechanism (not shown). Supported upon the base 1, by means of brackets 7, is a freely rotatable shaft 8 to which is fixed a pinion 9 that meshes with a rack 10 connected to the load-counterbalancing mechanism not shown, and fixed upon the shaft 8 are spiders 11, to the peripheries of which is secured a cylindrical chart 12. The load-counterbalancing and chart-moving mechanism are so arranged and adjusted that when a load is placed upon the goods platter 6 the chart is rotated through an angle which is proportional to the weight of the load on the platter. The weighing scale mechanism so far described is not of my invention and is known in commercial scales. Therefore, I have illustrated and described so much only of it as will suffice to show the connection of my invention therewith.

Upon the outer surface of the chart 12 are printed a series of columns 13 of computed value indications consisting of evenly spaced marks and value designating figures. The chart also carries a weight indicating column 14 of marks and figures in position to be viewed from the operator's side of the scale and a column 15 of weight indicating marks and figures to be viewed from the opposite side of the scale. The zero value marks of alternate value indicating columns 13 are arranged parallel to the axis of the chart in alignment with the zero mark of the weight indicating column 14, while the zero marks of value indicating columns 16 which are interspersed among the value indicating columns 13 are arranged along a line parallel to the axis of the chart but spaced from the zero mark of the weight indicating column 14 (see Figure VI).

Stretched along the front of the chart 12, in close proximity thereto, is an index line 17 so positioned that when the load-receiving platter 6 is empty the line 17 lies along the zero mark of the weight indicating column 14 and the zero marks of the value indicating columns 13, and a similar index line 18, also stretched in front of the chart 12, lies along the zero marks of the value indicating column 16 when the load-receiving platter 6 is empty. When a load is placed upon the load-receiving platter 6 the front side of the chart revolves upwardly under the indicating lines 17 and 18, thus bringing the mark and figure in the column 14 indicative of the nearest division of the weight of the load into juxtaposition to the index line 17 and the marks and figures in the columns 13 indicative of money values of the load at various prices into juxtaposition with the index line 17 and the marks and figures in the columns 16 indicative of money values of the load at other prices per pound into juxtaposition with the index line 18. The marks and figures in the weight indicating column 15 are brought into juxtaposition with an index line on the back of the scale. The column of figures 15 and the index line cooperating therewith may be of common form. The index line, therefore, is not shown.

In order that the movable chart of an indicating scale may operate with the least possible inertia and friction, and in order that the scale may be of light weight so that it can be easily moved about, and of small dimensions so as to occupy small counter space, it is important that the size of the cylindrical chart be small. It is also important, however, that there be a column of value computations for each of the prices at which merchandise weighed on the scale is likely to be sold; for scales to be used in foodshops about sixty columns of value indicating computations are desirable. It is also important that the size of the computed value figures in the columns be great enough for easy reading. To magnify the length of the chart as a whole would not only require an excessively large lens but it would also require that the overall dimensions of the window through which the chart were viewed be nearly as great as the magnified length of the chart, and, hence, would require an enlarged casing.

In order to meet the requirements of an adequate number of columns of easily legible computed value figures in a machine of small dimensions and light weight, I have made the columns narrow and have provided means to magnify the apparent width of each column separately.

The column magnifying means consists of a row of lenses 19 located in front of the section of the chart adjacent the index line 17 and a row of lenses 20 located in front of the section of chart adjacent the index line 18. Each of the lenses in the rows 19 and 20 has a cylindrical front face 21 curved about a vertical axis and a flat rear face 22 which lies adjacent the surface of the chart 12, the flat rear face 22 being approximately the width of one column of computed value figures and the curved front face 21 being approximately twice the width of the column. The curved front face 21 and the flat rear face 22 are connected with converging side faces 23 and 24 (see Figure V) which may be ground to prevent internal reflection and coated to render them opaque. The curved front surface 21 of each lens magnifies the flat rear surface 22 and the column of figures visible through the lens to an apparent width approximately double the actual width of the column. The interspersed columns of computed value figures 16 lie behind the wedge-shaped recesses between the lenses 19 and are not visible through the lenses 19. The relation of the lenses 20 to the interspersed columns of computed value figures 16 is the same, however, as the relation of the lenses 19 to the columns of computed value figures 13. Hence, the observer may read either a computed value in one of the columns 13 through one of the lenses 19, or a computed value in one of the columns 16 through one of the lenses 20.

In order to indicate the price at which the values in each of the columns 13 is computed, a price range plate 25 bearing a series of prices is located below the row of lenses 19, there being a price figure below each lens, and a second price range plate 26 is located above the row of lenses 20, with a price figure above each of the lenses 20.

A lens 27, shaped like the lenses 19 and 20 but of larger size, is located in front of the column of weight indicating Figures 14. In order to magnify the apparent vertical dimensions of the figures on the chart and the apparent spacing of the marks on the chart, a lens 28 having a front cylindrical surface curved about a horizontal axis is located in front of the row of lenses 19 and a lens 29 having a front cylindrical surface curved about a horizontal axis is located in front of the row of lenses 20. The index line 18 lies above a plane passing through the chart axis and the index line 17. Hence, rays of light normal to the surface of the chart at the index line 18 diverge upwardly from rays of light normal to the surface of the chart at the index line 18. In order to bend such rays of light so that they are approximately parallel as they pass to the eye of the observer, the rear flat face of the lens 28 slants downwardly away from the chart and the rear flat face of the lens 29 slants upwardly away from the chart. The lenses 28 and 29 thus bend rays passing in divergent planes from the rows of lenses 19 and 20 into approximate parallelism. The indicated weights and valves as magnified by the lenses 19, 20, 28 and 29 are visible to the operator of the scale through a window 30 in the housing 4, which window preferably is curved as indicated in Figure IV, and the appearance of the weights and values indicated and magnified by the device of my invention is illustrated in Figure III.

Since the marks and figures are magnified, it is desirable that the portion of the chart seen through the lenses be brightly illuminated. In the device of my invention such illumination is provided by elongated lamps 31 and 32 which are preferably located in the positions in which they are shown in Figures II, III and IV, so that they illuminate the price range plates 25 and 26, as well as the chart 12. The electric circuit which supplies current to the lamps 31 and 32 may contain a switch 33 which closes the circuit whenever the rack 10 is moved downwardly by a load on the load-receiving platter 6. The lamps are mounted on plates 34 and 35 which prevent light shining from the lamps directly through the window 30.

In the modified form of my invention illustrated in Figures VII, VIII and IX, a single price range plate 25a is located between the rows of lenses 19a and 20a, and a single lens 28a serves to magnify the vertical dimensions of the figures on the chart and the spacing between the marks. In the modified form of device the lens 28a is located in the opening in the housing 4a, so that it also serves as the viewing window. In the modified form of device the index lines 17a and 18a are spaced somewhat farther apart than in the form of device shown in Figures I–VI, inclusive. The lamps 31a and 32a for illuminating the chart and price range plate 25a are also located somewhat differently, and the plates 34a and 35a which prevent light from shining directly from the lamp through the lens 28a are shaped somewhat differently from the plates 24 and 35.

In Figures IX and X the lenses 19a are shown as formed in a set in which a plurality of lenses are molded in one piece. I have found that there is no appreciable distortion of the figures and marks seen through the lenses even when they are molded and their surfaces are not formed with extreme accuracy. While the small lenses 19 and 20 and the sets of lenses 19a may be made of glass, I have found that they also can be made of transparent synthetic resinous materials, some of which have refractive indices approximating that of optical glass. Highly accurate lenses may be molded of such synthetic resinous materials, and by molding the small lenses in sets, the cost of producing them, and also the cost of assembling them in the machine, is greatly reduced.

In Figure XI the lenses 19c are molded in sets but are of somewhat different form in that they are much thinner and their backs are joined in an unbroken plane. The function performed by the converging faces of the lenses shown in Figures V, IX and X, i. e. concealment of the adjacent columns of indicia, is performed in the modification of Figure XI by the wedge-shaped bars 36c, between which are openings with converging sides corresponding to the converging faces of the lenses shown in Figures V, IX and X. Sets of lenses such as are illustrated in Figure XI are simpler and cheaper to mold than sets like that illustrated in Figure X.

The invention herein shown and described is to be regarded as illustrative only, and it is to be understood that the invention is susceptible to variation, modification and change within the spirit and scope of the subjoined claims.

Having described my invention, I claim:

1. In a device of the class described, in combination, a computing chart having a series of columns of indicia, said columns being in consecutive order, and another series of columns of indicia, said columns being in consecutive order and being alternately interdisposed among the columns of the first said series and vertically offset with respect thereto, a continuous row of small lenses extending over a portion of said chart in close proximity thereto, each of which is stationed in front of a column of the first said series and overlaps portions of adjacent columns of the second said series; and a second row of small lenses lying adjacent and parallel to the first said row and also extending over a portion of said chart in close proximity thereto, each of the lenses of the second said row being stationed in front of a column of the second said series and overlapping portions of adjacent columns of the first said series, whereby the alternate divisions of said chart are viewed through said lenses as two separate collections.

2. In a device of the class described, in combination, a computing chart having a series of columns of indicia, said columns being in consecutive order, and another series of columns of indicia, said columns being in consecutive order and being alternately interdisposed among the columns of the first said series and vertically offset with respect thereto; a continuous row of small lenses extending over a portion of said chart in close proximity thereto, each of which is stationed in front of a column of the first said series and overlaps portions of adjacent columns of the second said series, a second row of small lenses lying adjacent and parallel to the first said row and also extending over a portion of said chart in close proximity thereto, each of the lenses of the second said row being stationed in front of a column of the second said series and overlapping portions of adjacent columns of the first said series, whereby the alternate divisions of said chart are viewed through said lenses as two separate collections, and means located along said rows of lenses and bearing distinctive price indicia corresponding to the several lenses, said price indicia being positioned exteriorly of said lenses.

3. In a device of the class described, in combination, a chart having a series of columns of indicia, said columns being in consecutive order, and another series of columns of indicia, said columns being in consecutive order, and being alternately interdisposed among the columns of the first said series and vertically offset with respect thereto, a row of magnifying lenses, each stationed in front of a column of the first said series and overlapping portions of adjacent columns of the second said series, and a second parallel row of lenses horizontally offset with respect to the first said row, each of the lenses of the second said row being stationed in front of a column of the second said series and overlapping portions of adjacent columns of the first said series, means for preventing the columns of the second said series from being viewed through the lenses of the first said row, and means for preventing the columns of the first said series from being viewed through the lenses of the second said row, whereby the columns of each of said series appear to be arranged in a separate collection of consecutive order.

4. In a device of the class described, in combination, a chart having a series of columns of indicia, said columns being in consecutive order, and another series of columns of indicia said columns being in consecutive order, and being alternately interdisposed among the columns of the first said series and vertically offset with respect thereto, a row of magnifying lenses, each stationed in front of a column of the first said series and overlapping portions of adjacent columns of the second said series, and a second parallel row of lenses horizontally offset with respect to the first said row, each of the lenses of the second said row being stationed in front of a column of the second said series and overlapping portions of adjacent columns of the first said series, means for preventing the columns of the second said series from being viewed through the lenses of the first said row, and means for preventing the columns of the first said series from being viewed through the lenses of the second said row, whereby the columns of each of said series appear to be arranged in a separate collection of consecutive order, said lenses having surfaces curved about axes which extend in the same general direction as the columns, whereby the columns are magnified transversely.

5. In a device of the class described, in combination, a chart having a series of columns of indicia, said columns being in consecutive order, and another series of columns of indicia, said columns being in consecutive order, and being alternately interdisposed among the columns of the first said series and vertically offset with respect thereto, a row of magnifying lenses, each stationed in front of a column of the first said series and overlapping portions of adjacent columns of the second said series, and a second parallel row of lenses horizontally offset with respect to the first said row, each of the lenses of the second said row being stationed in front of a column of the second said series and overlapping portions of adjacent columns of the first said series, said lenses having side faces converging rearwardly toward each other and rear faces narrower in width than their front faces, whereby the columns of each of said series appear to be arranged in a separate collection of consecutive order.

6. In a device of the class described, in combination, a chart having a series of columns of indicia, said columns being in consecutive order, and another series of columns of indicia, said columns being in consecutive order, and being alternately interdisposed among the columns of the first said series and vertically offset with respect thereto, a row of magnifying lenses, each stationed in front of a column of the first said series and overlapping portions of adjacent columns of the second said series, and a second, parallel row of lenses horizontally offset with respect to the first said row, each of the lenses of the second said row being stationed in front of a column of the second said series and overlapping portions of adjacent columns of the first said series, said lenses having side faces converging rearwardly toward each other and rear faces narrower in width than their front faces, whereby the columns of each of said series appear to be arranged in a separate collection of consecutive order, the lengths of the lenses in the direction of the axes about which their surfaces are curved being substantially greater than the widths of their front faces.

7. In a device of the class described, in combination, a chart having a series of columns of indicia, said columns being in consecutive order, and another series of columns of indicia, said columns being in consecutive order, and being alternately interdiposed among the columns of the first said series and vertically offset with respect thereto, a row of lenses a plurality of which are integrally joined together, each lens of said row being stationed in front of a column of the first said series and overlapping portions of adjacent columns of the second said series, and a second parallel row of lenses a plurality of which are integrally joined together, each of the lens of the second said row being stationed in front of a column of the second said series and overlapping portions of adjacent columns of the first said series, means for preventing the columns of the second said series from being viewed through the lenses of the first said row, and means for preventing the columns of the first said series from being viewed through the lenses of the second said row, whereby the columns of each of said series appear to be arranged in a separate collection of consecutive order.

8. In a device of the class described, in combination, a chart having a series of columns of indicia, said columns being in consecutive order, and another series of columns of indicia, said columns being in consecutive order, and being alternately interdisposed among the columns of the first said series and vertically offset with respect thereto, a row of magnifying lenses a plurality of which are integrally joined together, each of said lenses being stationed in front of a column of the first said series and overlapping portions of adjacent columns of the second said series, and a second parallel row of lenses a plurality of which are integrally joined together, the lenses of the second said row being horizontally offset with respect to the lenses of the first said row, each of the lenses of the second said row being stationed in front of a column of the second said series and overlapping portions of adjacent columns of the first said series, said lenses having side faces converging rearwardly toward each other and rear face narrower in width than their front faces, whereby the columns of each of said series appear to be arranged in a separate collection of consecutive order, the lengths of the lenses in the direction of the axes about which their surfaces are curved being substantially greater than the widths of their front faces.

9. In a device of the class described, in combination, a computing chart having a series of columns of indicia, said columns being in consecutive order, and another series of columns of indicia, said columns being in consecutive order and being alternately interdisposed among the columns of the first said series and vertically offset with respect thereto, a continuous row of small lenses a plurality of which are integrally joined together, said row of small lenses extending over a portion of said chart in close proximity thereto, each of which is stationed in front of a column of the first said series and overlaps portions of adjacent columns of the second said series, a second row of small lenses a plurality of which are integrally joined together, said second row of small lenses lying adjacent and parallel to the first said row and also extending over a portion of said chart in close proximity thereto, each of the lenses of the second said row being stationed in front of a column of the second said series and overlapping portions of adjacent columns of the first said series, whereby said alternate divisions appear to be arranged in separate collections, and means located along said rows of lenses and bearing distinctive price indicia corresponding to the several lenses, said price indicia being positioned exteriorly of said lenses.

LAWRENCE S. WILLIAMS.